United States Patent
Aramaki

(10) Patent No.: US 7,960,451 B2
(45) Date of Patent: Jun. 14, 2011

(54) METHOD FOR PRODUCING POLYAMIDE MASTERBATCH

(75) Inventor: Masaaki Aramaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 90 days.

(21) Appl. No.: 12/296,452

(22) PCT Filed: Apr. 10, 2007

(86) PCT No.: PCT/JP2007/057868
§ 371 (c)(1),
(2), (4) Date: Oct. 8, 2008

(87) PCT Pub. No.: WO2007/117007
PCT Pub. Date: Oct. 18, 2007

(65) Prior Publication Data
US 2009/0281210 A1    Nov. 12, 2009

(30) Foreign Application Priority Data
Apr. 11, 2006   (JP) .................................. 2006-108518

(51) Int. Cl.
*C08J 3/20*    (2006.01)
(52) U.S. Cl. ....................................... 523/351; 524/210
(58) Field of Classification Search .................. 523/351; 524/210
See application file for complete search history.

(56) References Cited

U.S. PATENT DOCUMENTS
5,686,513 A    11/1997   Liehr

FOREIGN PATENT DOCUMENTS

| JP | 50-148461 | 11/1975 |
| JP | 7-18176 | 1/1995 |
| JP | 2000-154472 | 6/2000 |
| JP | 2001-186199 | 7/2000 |
| JP | 2004-211083 | 7/2004 |

OTHER PUBLICATIONS

English language abstract of JP 2001-186199.
English language Abstract of JP 50-148461.
English language Abstract of JP 2004-211083.
English language Abstract of JP 7-18176.
English language Abstract of JP 2000-154472.

*Primary Examiner* — Edward J Cain
(74) *Attorney, Agent, or Firm* — Greenblum & Bernstein, PLC

(57) ABSTRACT

A polyamide masterbatch free from metal copper deposition and metal corrosion in an extruder or a molding machine, deterioration in mechanical physical properties of the product, and a color change of appearance due to water absorption and having improved heat aging resistance is produced by mixing, by melt kneading, a) 100 parts by weight of a polyamide having a water content of from 0.05 to 2.0 wt. %, b) from 0.1 to 10 parts by weight of an organic compound having at least one amide group, c) from 0.1 to 5 parts by weight of a copper compound having a maximum particle size of 50 μm or less, and d) from 1 to 50 parts by weight of a halogen compound (with the proviso that a copper halide is excluded) having a maximum particle size of 50 μm or less.

13 Claims, No Drawings

METHOD FOR PRODUCING POLYAMIDE MASTERBATCH

TECHNICAL FIELD

The present invention relates to a polyamide masterbatch that can be used for providing polyamide molded or formed products with excellent toughness, heat aging resistance, appearance, and color tone, without causing problems such as metal deposition and corrosion during extrusion or molding processing and providing.

BACKGROUND ART

Polyamide resins have been used popularly for automobile and electric or electronic fields because of their excellent mechanical properties, heat resistance, chemical resistance, and flame retardancy. Different from the other resins, the polyamide resins are particularly excellent in long-term heat aging resistance so that they are used for parts, for example in an automobile engine room, to which heat of very high temperature is applied. The environmental temperature in the automobile engine room becomes increasingly high with a rise in the density of parts in the engine room and an increase in engine output. Accordingly, the polyamide resins are demanded to have a higher long-term heat aging resistance.

A number of technical improvements have been made to satisfy the above-described demand. Examples of them include a polyamide resin composition containing a copper halogen compound and a polyamide resin composition containing an aromatic amine or hindered phenol antioxidant. Of these, a technique for improving heat aging resistance using a mixture of a copper compound and a halogen compound is particularly excellent from the viewpoint of cost and it is used widely now.

A copper compound and a halogen compound are incorporated in a polyamide resin, for example, by preparing an aqueous solution containing the copper compound and the halogen compound and adding the resulting solution in a polymerization step, such as prior to polymerization or during polymerization of the polyamide, or adding it at any time after polymerization (blending, melt kneading, or the like with the polyamide resin). The method of adding it during a polymerization step is desired for uniformly dispersing the copper compound and the halogen compound, but appearance of intermediate products at the time when brand of these raw materials is exchanged or necessity of washing of a polymerizer may deteriorate a production efficiency. On the other hand, in the method of adding after polymerization, dispersibility becomes inferior to that in the method of adding it during a polymerization step, which leads to deterioration in the mechanical physical properties. This method has another problem that a molded or formed product of the polymer gradually absorbs water, and its color changes from white to green and therefore has poor appearance. Furthermore, extent of this color changing increases with an increase in copper concentration.

In the method of adding the aqueous solution after polymerization, methods of using various compounds in combination in order to improve the dispersibility of the copper compound and the halogen compound (refer to, for example, Patent Documents 1 and 2) are proposed.

Patent Document 1 discloses incorporating, as a lubricant, a higher fatty acid such as lauric acid, a higher fatty acid metal salt of, for example, a higher fatty acid and aluminum, a higher fatty acid amide such as ethylenebisstearylamide, or a wax such as polyethylene wax. According to the technique disclosed therein, addition of finely-ground halogen compound is proposed, based on considerations that it is not preferred to add an aqueous solution to a hygroscopic polyamide resin, or it is preferred not to incorporate water in a polyamide resin composition which is material of a molded or formed product. It is also proposed that since the halogen compound is apt to agglomerate and become solidified easily when it is added in a finely-ground form without taking any measure, a lubricant is added to the halogen compound in advance to suppress agglomeration and solidification, thereby enabling addition of it in the finely-ground form and improving the appearance.

Patent Document 2 discloses a tablet for stabilizing a polyamide obtained by mixing Stabilizer 1 (CuI, CuBr or the like) having an average particle size not greater than 2 μm, Stabilizer 2 (CuI, CuBr, KI, KBr, or the like) having a particle size ranging from 2 to 200 μm and a wax having an alkyl group with 15 or greater carbon atoms and having, in the molecular chain thereof, a functional group selected from acids, amides, esters, and allyl. This document discloses that the tablets from which powders do not drop easily by friction can be obtained by the above-described technique.

In each of these techniques, a copper compound and a halogen compound are incorporated in a polyamide without using a solvent such as water, but there is still a room for improvement in copper deposition, metal corrosion, and agglomeration of a halogen compound.

Thus, by the conventional method of adding a copper compound and a halogen compound after having polymerized a polyamide, uniform and fine dispersion of the copper compound and the halogen compound has not been achieved yet and therefore a polyamide resin composition having a satisfactory performance cannot be obtained.

[Patent Document 1] Japanese Patent Laid-Open No. Sho 50-148461
[Patent Document 2] U.S. Pat. No. 5,686,513

DISCLOSURE OF THE INVENTION

Problems to be solved by the Invention

An object of the present invention is to provide a polyamide masterbatch improved in dispersibility of the copper compound and the halogen compound, being free from deposition of copper or metal corrosion in an extruder or molding machine, deterioration in mechanical physical properties of its product, and a color change of appearance due to water absorption, and having improved heat aging resistance, by a method where a copper compound and a halogen compound are added after having polymerized a polyamide.

Means for Solving the Problems

The present inventors have proceeded with an extensive investigation with a view to overcoming the above-described problem. As a result, it has been found that the above-described problems can be overcome by using a polyamide comprising water and melt kneading it in the presence of a specific organic compound, leading to the completion of the present invention.

In the present invention, there is thus provided a method for producing a masterbatch, which comprises mixing, by melt kneading, a) 100 parts by weight of a polyamide having a water content of from 0.05 to 2.0 wt. %, b) from 0.1 to 10 parts by weight of an organic compound having at least one amide group, c) from 0.1 to 5 parts by weight of a copper compound having a maximum particle size of 50 μm or less, and d) from 1 to 50 parts by weight of a halogen compound (with the proviso that a copper halide is extruded) having a maximum particle size of 50 μm or less.

In the conventional technique, it is tried to improve the dispersibility of a copper compound and a halogen compound in a masterbatch by optimizing the kind of a lubricant or controlling the particle size of the copper-compound and halogen compound.

In contrast, the present invention has been achieved the object based on an utterly new technical concept that by using a polyamide in which or on the surface of which water, which dissolves a copper compound and a halogen compound therein, is caused to exist, the copper compound and halogen compound are dissolved in the water and thereby they are dispersed in the polyamide uniformly and finely and at the same time, such finely dispersed compounds are stabilized by an amide-containing organic compound.

Effect of the Invention

Compared with a masterbatch produced in a conventional manner by adding a copper compound and a halogen compound after having polymerized a polyamide, the masterbatch comprising a copper compound and a halogen compound produced by the method of the present invention is improved in dispersibility of the halogen compound and the copper compound, with reduced metal copper deposition and metal corrosion in an extruder or a molding machine, and is excellent in stability during processing. In addition, according to the present invention, improvement in heat aging resistance and prevention of a change in color of appearance due to water absorption can be achieved without deteriorating the mechanical physical properties of the product.

Moreover, surprisingly, even compared with a masterbatch produced by adding a copper compound and a halogen compound during a polymerization step, the masterbatch of the present invention can provide a molded or formed product causing less metal copper deposition and superior in heat aging resistance and appearance. In addition, the present invention is effective for drastically reducing copper deposition during processing.

The method of the present invention enables an increase in a production yield by adding a copper compound and a halogen compound to a polyamide resin by melt kneading which provides a high production efficiency, and at the same time enables production of a product having a high heat aging resistance and high-quality appearance equal to or superior to those of the products obtained by adding the copper compound and the halogen compound during a polymerization step.

The present invention will hereinafter be described specifically.

First, the polyamide is described.

The polyamide to be used in the present invention is not particularly limited and it is a polymer having an amide bond (—NHCO—) in the main chain thereof. Examples include polycaprolactam (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 61), polynonanemethylene terephthalamide (9T), polyhexamethylene terephthalamide (6T), polybis(4-aminocyclohexyl)methane dodecamide (nylon PACM12), polybis(3-methyl-aminocyclohexyl)methane dodecamide (nylondimethyl PACM12), polymethaxylylene adipamide (nylon MXD6), and polyundecamethylene hexahydroterephthalamide (nylon 11T(H)). The polyamide may be a polyamide copolymer comprising two or more of the above-described polyamide components different from each other or a mixture of them. Presence or absence of an amide bond can be confirmed with infrared absorption spectrum (IR).

Raw materials for the polyamide to be used in the present invention are not particularly limited insofar as they are known raw materials used for the production of the above-described polymer having, in the main chain thereof, an amide bond (—NHCO—). Examples include polymerizable amino acids, polymerizable lactams, polymerizable salts or mixtures of a diamine and a dicarboxylic acid, and polymerizable oligomers. These raw materials may be used as-are or as an aqueous solution.

The polyamide to be used in the present invention has a concentration ratio of carboxyl groups ranging preferably from 0.55 to 0.80, more preferably from 0.60 to 0.75.

The term "concentration ratio of carboxyl groups" as used herein means a calculated value of $[COOH]/([COOH]+[NH_2])$ wherein [COOH] means a concentration of carboxyl groups in the polyamide and $[NH_2]$ means a concentration of amino groups in the polyamide. Copper deposition or metal corrosion in a molding machine can be prevented by controlling the concentration of carboxyl groups within the above-described range. The concentration ratio of carboxyl groups can be adjusted by adding a terminal modifier to the raw materials of the polyamide.

Although the terminal modifier is not particularly limited insofar as it has, in the molecular structure thereof, a carboxylic acid, dicarboxylic acids and monocarboxylic acids are preferred. Examples of the dicarboxylic acids include malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid, dodecanedioic acid, eicodionic acid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroterephthalic acid, and diglycolic acid.

Examples of the monocarboxylic acids include aliphatic monocarboxylic acids such as acetic acid, propionic acid, butyric acid, valeric acid, caproic acid, capric acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid. These carboxylic acid compounds may be used either singly or in combination of two or more.

A polyamide can be produced in a known manner. For example, ring-opening polycondensation using a lactam such as ε-caprolactam as the raw material of the polyamide or heat melting using a diamine/dicarboxylate such as hexamethylene adipamide or a mixture thereof as the raw material can be employed. Furthermore, solid-phase polymerization wherein polymerization is carried out at a temperature not greater than the melting point of a solid salt of a polyamide raw material or the melting point of a polyamide or solution polymerization using a dicarboxylic acid halide component and a diamine component can be employed. These methods may be used in combination as needed. Of these, heat melting and combination of heat melting and solid-phase polymerization are most effective. The polymerization may be either batch or continuous polymerization. The polymerization apparatus is also not particularly limited and a known one such as an autoclave-type reactor, a tumbler type reactor, or an extrusion type reactor such as kneader can be employed.

The polyamide has a water content of preferably from 0.05 to 2.0 wt. %, more preferably from 0.1 to 1.5 wt. %, still more preferably from 0.1 to 1.0 wt. %.

The water content can be measured by coulometric titration (Karl Fischer method) with 0.7 g of a polyamide while using a water vaporizer ("VA-06, product of Mitsubishi Chemical).

Water in the polyamide may be present as water within the polyamide, which is water bonded to the polyamide molecule, or water attached onto the surface of the polyamide, such as the surface of polyamide pellets or polyamide powders. Water within the polyamide that is water bonded to the polyamide molecule is preferred, because it can prevent copper deposition and metal corrosion.

By controlling the water content of the polyamide to fall within the range of the present invention, it is possible to make the dispersed particle size of the copper compound or halogen compound in the masterbatch smaller than that before mixing and at the same time, suppress the agglomeration of the particles.

This enables improvement in the mechanical properties such as toughness and heat aging resistance of products produced from the masterbatch and suppression of copper deposition and metal corrosiveness.

The water content of the polyamide can be adjusted by controlling the pressure reduction degree in the latter half period of polymerization, immersion time or immersion length in water during discharging and cooling the polymer, or a spraying amount of water.

With regard to the molecular weight of the polyamide, the relative viscosity in a 1% solution of the polyamide in 98% sulfuric acid at 25° C. as measured in accordance with JIS-K6810 is preferably from 1.5 to 6.5, more preferably from 1.7 to 6.0, still more preferably from 2.0 to 5.5. By controlling the relative viscosity within the above-described range, melt kneading for the production of a masterbatch can be performed with high productivity.

The copper compound and the halogen compound will next be described.

Examples of the copper compound to be used in the present invention include copper halides, copper acetate, copper propionate, copper benzoate, copper adipate, copper terephthalate, copper isophthalate, copper salicylate, copper nicotinate, and copper stearate, and copper complex salts coordinated to a chelating agent such as ethylenediamine (en) or ethylenediaminetetraacetic acid. These copper compounds may be used either singly or as a mixture of two or more of them. Of these, copper iodide, cuprous bromide, cupric bromide, cuprous chloride, and copper acetate are preferred.

The copper compound is added in an amount of preferably from 0.1 to 5 parts by weight, more preferably from 0.25 to 4 parts by weight, still more preferably from 0.40 to 3 parts by weight, each based on 100 parts by weight of the polyamide. By controlling the amount of the copper compound to fall within the above-described range, sufficient improvement in heat aging resistance and suppression of copper deposition and corrosion can be achieved.

Examples of the halogen compound (with the proviso that copper halides are excluded) to be used in the present invention include potassium iodide, sodium iodide, potassium bromide, potassium chloride, and sodium chloride. These halogen compounds may be used either singly or as a mixture of two or more.

The halogen compound is added in an amount of preferably from 1 to 50 parts by weight, more preferably from 5 to 45 parts by weight, still more preferably from 10 to 40 parts by weight, each based on 100 parts by weight of the polyamide. By controlling the amount of the halogen compound to fall within the above-described range, sufficient improvement in heat aging resistance and suppression of copper deposition and corrosion can be achieved.

The copper compound and the halogen compound to be mixed with the polyamide have each a maximum particle size of preferably 50 µm or less, more preferably 20 µm or less, still more preferably 10 µm or less.

The term "particle size" as used herein means a biaxial average size, that is, average of a short diameter and a long diameter of the particle. The terms "short diameter" and "long diameter" of the particle as used herein mean a short side and a long side of a rectangle which is circumscribed to the particle and has a minimum area, respectively. The maximum particle size of each of the copper compound and the halogen compound can be determined by observing at least 50 particles with a scanning electron microscope (SEM).

By controlling the maximum particle size to 50 µm or less, the copper compound and the halogen compound can be dispersed finely in the polyamide even if the water content in the polyamide is low, problems such as metal deposition and corrosion can be reduced, and the polyamide resin composition obtainable from it has improved toughness, heat aging resistance, appearance, and color tone.

The copper compound and the halogen compound (with the proviso that copper halides are excluded) may be effective when either one of them is added. However, in order to improve the performance of the resulting polyamide resin composition, both are added in the present invention. A molar ratio of halogen to copper (halogen/copper molar ratio) in the masterbatch is preferably from 3 to 30, more preferably from 4 to 25, still more preferably from 5 to 23. The halogen/copper molar ratio of 3 or greater is preferred because copper deposition and metal corrosion can be suppressed. When the halogen/copper molar ratio is not greater than 30, on the other hand, the corrosion of a screw of a molding machine can be prevented without damaging the mechanical physical properties such as toughness.

In the next place, an organic compound having at least one amide group will be described.

In the present invention, presence of an organic compound having at least one amide group during melt kneading is necessary. The organic compound having at least one amide group is presumed to form, during melt kneading, a complex with the copper compound or the halogen compound dissolved in the water of the polyamide, thereby stabilizing dispersion of the copper compound or halogen compound in the polyamide and preventing copper deposition or change in quality without adversely affecting the polyamide.

The organic compound having at least one amide group to be used in the present invention is a compound having, in the molecular chain thereof, at least one amide group. Specific examples include monoamides, substituted amides, methylolamides, and bisamides.

The monoamides are represented by the formula R—$CONH_2$ (wherein, R represents any of saturated aliphatic, unsaturated aliphatic, or aromatic groups with 8 to 30 carbon atoms, or these groups, some —H(s) of which have been substituted with —OH(s)). Specific examples include lauric acid amide, palmitic acid amide, stearic acid amide, behenic acid amide, hydroxystearic acid amide, oleic acid amide, erucic acid amide, and licinolic acid amide.

The substituted amides are represented by the formula $R_1$—CONH—$R_2$ (wherein, $R_1$ and $R_2$ each independently represents any of saturated aliphatic, unsaturated aliphatic, or aromatic groups with 8 to 30 carbon atoms, or these groups, some —H(s) of which have been substituted with —OH(s)). Specific examples include N-lauryl lauric acid amide, N-palmityl palmitic acid amide, N-stearyl stearic acid amide, N-oleyl oleic acid amide, N-stearyl oleic acid amide, N-oleyl stearic acid amide, N-stearyl erucic acid amide, N-oleyl palmitic acid amide, N-stearyl-12-hydroxystearic acid amide, and N-oleyl-12-hydroxystearic acid amide.

The methylolamides are represented by the following formula: R—CONHCH$_2$OH (wherein, R represents any of saturated aliphatic, unsaturated aliphatic, or aromatic groups with 8 to 30 carbon atoms, or these groups, some —H(s) of which have been substituted with —OH(s)). Specific examples include methylolstearic acid amide and methylolbehenic acid amide.

The bisamides are represented by the following formula: (R—CONH)$_2$(CH$_2$)$_n$ (wherein, R represents any of saturated aliphatic, unsaturated aliphatic, or aromatic groups with 8 to 30 carbon atoms, or these groups, some —H(s) of which have been substituted with —OH(s) and n stands for 1 to 8).

Specific examples include methylenebislauric acid amide, methylenebislauric acid amide, methylenebishydroxystearic acid amide, ethylenebiscaprylic acid amide, ethylenebislauric acid amide, ethylenebisstearic acid amide, ethylenebisisostearic acid amide, ethylenebishydroxystearic acid amide, ethylenebisbehenic acid amide, hexamethylenebisstearic acid amide, hexamethylenebisbehenic acid amide, hexamethylenebishydroxystearic acid amide, butylenebishydroxystearic acid amide, N,N'-distearyladipic acid amide, N,N'-distearylsebacic acid amide, methylenebisoleic acid amide, ethylenebisoleic acid amide, ethylenebiserucic acid amide, hexamethylenebisoleic acid amide, N,N'-dioleyladipic acid amide, N,N'-dioleylsebacic acid amide, m-xylylenebisstearic acid amide, and N,N'-distearylisophthalic acid amide.

These organic compounds having at least one amide group may be used either singly or as a mixture of two or more of them. Of these, the bisamides are preferred.

The organic compound having at least one amide group is added in an amount of preferably from 0.1 to 10 parts by weight, more preferably from 0.5 to 5.0 parts by weight, still more preferably from 1.0 to 4.0 parts by weight, each based on 100 parts by weight of the polyamide. By controlling the amount of it to fall within the above-described range, dispersibility of the copper compound or halogen compound in the polyamide can be improved further, leading to sufficient improvement in the heat aging resistance and suppression of copper deposition and corrosion.

Next, melt kneading of the copper compound, the halogen compound, and the organic compound having at least one amide group, with the polyamide will be described.

In the present invention, the copper compound, the halogen compound, and the organic compound having at least one amide group may be each independently added to the polyamide; at least two of these three compounds may be mixed in advance and then added to the polyamide; at least two of these three compounds may be mixed and ground in advance and then added to the polyamide; or at least two of these three compounds may be mixed, ground, and tableted in advance and then added to the polyamide.

The compounds may be mixed in a known manner, for example, by using any of a tumbler, Henschel mixer, Ploughshare mixer, Nauta mixer, flow jet mixer or the like.

The compounds may be ground in a known manner, for example, by using any of a hammer mill, knife mill, ball mill, jaw crusher, cone crusher, roller mill, jet mill, millstone, or the like.

The compounds may be tableted in any known manner such as compression granulation, tableting, dry extrusion granulation, and melt extrusion granulation.

An apparatus for melt kneading is not particularly limited and any known apparatus can be used. For example, melt kneaders such as single-screw or twin screw extruder, Bambury mixer, and mixing roll are preferred. Of these, a twin screw extruder is preferred. The melt kneader may be equipped with a deaeration mechanism (vent) apparatus and side feeder equipment.

The melt kneading temperature in the present invention is preferably a temperature higher by about 1 to 100° C. than the melting point or softening point of the polyamide as determined by the differential scanning calorimetry (DSC) in accordance with JIS K7121. The shear rate of the kneader is preferably about 100 (SEC$^{-1}$) or greater and an average retention time at the time of kneading is preferably from about 1 to 15 minutes.

Next, the masterbatch produced by the production method of the present invention will be described.

The masterbatch to be produced by the production method of the present invention has a water content of preferably from 0.06 to 1.0 wt. %, more preferably from 0.10 to 0.75 wt. %, still more preferably from 0.15 to 0.75 wt. %. The water in the masterbatch may be present as water bonded to the polyamide molecule or water attached to the surface of the masterbatch, such as, the surface of masterbatch pellets or masterbatch powders. By controlling the water content to fall within the above-described range, the agglomeration of the copper compound or the halogen compound can be suppressed, which is highly effective for improving the mechanical properties such as toughness and heat aging resistance. This enables suppression of copper deposition and metal corrosiveness further.

The water content of the masterbatch can be adjusted by controlling the pressure reduction degree of an extruder, immersion time or immersion length in a strand bath during cooling, or a water spraying amount.

Next, production of a polyamide resin composition from the masterbatch will be described.

A polyamide resin composition can be produced by mixing, with 100 parts by weight of a second polyamide, 0.1 to 100 parts by weight, preferably from 0.5 to 20 parts by weight of the masterbatch. By mixing them in amounts within the above-described ranges, it is possible to achieve the object of the present invention, more specifically, to obtain a polyamide resin composition having reduced copper deposition and metal corrosion in an extruder or a molding machine and therefore having excellent stability during processing and at the same time, having improved heat aging resistance and causing less color change in appearance due to water absorption. The second polyamide may be mixed with the masterbatch by blending or melt kneading.

As the second polyamide, the polyamides similar to those exemplified above in the production of the masterbatch are usable.

The polyamide resin composition thus obtained has a water content of preferably from 0.01 to 1 wt. %, more preferably from 0.03 to 0.5 wt. %, more preferably from 0.05 to 0.30 wt. %. The water in the polyamide resin composition may be present as water bonded to the polyamide molecule or water attached to the surface of the polyamide resin composition, such as the surface of pellets or powders. From the viewpoint of developing the effect of the present invention more markedly, water is preferably bonded to the polyamide molecule. By controlling the water content to fall within the above-described range, the agglomeration of the copper compound or halogen compound can be suppressed. This is highly effective for improving the mechanical properties such as toughness and heat aging resistance and enables prevention of copper deposition and metal corrosiveness further.

The water content of the polyamide resin composition can be adjusted by controlling the pressure reduction degree of an extruder, an immersion time or immersion length in a strand bath during cooling, or a water spraying amount.

The polyamide resin composition may comprise additives conventionally used for polyamides within an extent not impairing the object of the present invention. Examples include pigments, dyes, flame-retardants, lubricants, fluorescent bleaching agents, plasticizers, organic anti-oxidants, heat stabilizers, ultraviolet absorbers, nucleating agents, rubbers, and reinforcing agents.

Since the polyamide resin composition thus obtained is free from problems such as metal deposition or corrosion during extrusion or molding and excellent in toughness, heat aging resistance, appearance, and color tone, a variety of molded or formed products can be obtained from it by using a known molding or forming method such as press molding, injection molding, gas assist injection molding, welding, extrusion, blow molding, film processing, hollow molding, multilayer molding, or melt spinning. Molded or formed products thus obtained are useful as various molding applications (such as automobile parts, parts for industrial use, electronic parts, and gears) or various extrusion applications (such as tubes, rods, filaments, films, and blow molded articles).

EXAMPLES

The present invention will hereinafter be described based on Examples. In Examples and Comparative Examples, measurement and evaluation were made in accordance with the following methods.

(1) Relative Viscosity of Polyamide

The relative viscosity of a polyamide is measured in accordance with JIS-K6810. Described specifically, it is measured at 25° C. by preparing a 1% solution in 98% sulfuric acid ((1 g of the polyamide resin)/(100 ml of 98% sulfuric acid)).

(2) Water Content of Each of Polyamide, Masterbatch, and Polyamide Resin Composition The water content is measured by coulometric titration (Karl Fischer method) with 0.7 g of a polyamide while using a water vaporizer ("VA-06", product of Mitsubishi Chemical).

(3) Concentration Ratio of Carboxyl Groups in Polyamide

The concentration of carboxyl groups is measured dissolving pellets or and ground molded products of a polyamide in benzyl alcohol. Described specifically, 50 ml of benzyl alcohol is added to about 4.0 g of a sample. After heating the resulting mixture to 170° C., phenolphthalein is added thereto to dissolve them. The resulting solution is titrated with a 0.1N aqueous NaOH solution to determine the concentration of carboxyl groups.

$$\text{Concentration of carboxyl groups [COOH]} = (f \times 0.1 \times A/S) \times 1000 f$$

wherein, f=a factor of a 0.1N aqueous NaOH solution,
A=a consumed amount (ml) of the 0.1N aqueous NaOH solution, and
S=mass (g) of a sample The concentration of amino groups is, on the other hand, determined by dissolving pellets or ground molded products of a polyamide in an aqueous phenol solution. Described specifically, after about 3.0 g of a sample is dissolved in 100 ml of a 90% aqueous phenol solution, the resulting solution is titrated with 1/40N hydrochloric acid and an amount of hydrochloric acid required to reach a neutralization point is determined. In a same manner except that the sample is not added, a blank test is performed.

$$\text{Concentration of amino groups [NH}_2\text{]} = \{F \times (1/40) \times (A-B)/S\} \times 1000F$$

wherein, F=a factor of 1/40N hydrochloric acid,
A=a consumed amount (ml) of 1/40N hydrochloric acid
B=a consumed amount (ml) of 1/40N hydrochloric acid (in the blank test)
S=mass (g) of a sample A concentration ratio of carboxyl groups=[COOH]/([COOH]+[NH$_2$]) is calculated from the concentrations of [COOH] and [NH$_2$] thus obtained.

(4) Maximum Particle Size of Copper Compound and Halogen Compound

The maximum particle size of each compound is determined by taking a bright field image at an optimum magnification with "S-5000" manufactured by Hitachi, Ltd. and arbitrarily selecting 100 particles.

(5) Copper Concentration and Halogen Concentration of Masterbatch, and Halogen/Copper Molar Ratio (Halogen/Cu)

The copper concentration is determined by adding sulfuric acid to a sample, adding nitric acid dropwise to the resulting mixture while heating, thereby decomposing the organic component, adding pure water to the decomposed solution to give a constant volume, and then, subjecting the resulting solution to ICP emission spectrometry (high-frequency plasma emission spectrometry). As an ICP emission spectrometer, "Vista-Pro", manufactured by SEIKO Instruments is used.

A determination method of a halogen concentration will next be described with iodine as an example. The sample is burnt in a flask purged with high-purity oxygen, the gas thus generated is collected in an absorbing solution, and an iodine concentration in the resulting solution is determined potentiometrically with a 1/100 N silver nitrate solution.

The halogen/copper molar ratio (halogen/Cu) is calculated by converting the determined values into moles by using their molecular weights, respectively.

(6) Copper Deposition, Metal Corrosiveness, and Surface Condition of Masterbatch (6-1) Copper Deposition Property The masterbatch is brought into contact with a test carbon steel and put into an autoclave. After hermetically sealing, the autoclave is purged with nitrogen. After retention at 280° C. for 6 hours, the resulting masterbatch is cooled and a copper deposition state of a portion of the masterbatch that was brought into contact with the test carbon steel is evaluated.

A: No or very slight copper deposition has occurred.
B: Copper deposition has occurred slightly.
C: Frequent copper deposition is observed.

(6-2) Metal Corrosiveness

The portion of the test carbon steel that was brought into contact with the masterbatch in (6-1) is evaluated for its corrosion state. In order to show the degree of corrosion quantitatively, the corrosion coefficient is calculated as described below and the degree of corrosion is evaluated in the following manner. As the value is smaller, the corrosiveness of the masterbatch is lower.

Corrosion coefficient=generation frequency (pieces/cm$^2$) of corrosion×average diameter of corrosion (μm)×average depth of corrosion (μm)

A: corrosion coefficient less than 500
B: corrosion coefficient from 500 to 2500
C: corrosion coefficient>2500

(6-3) Surface Condition of Pellets

The surface of the masterbatch pellets is visually observed and the appearance thereof is evaluated.

A: pellets have a smooth and are in a good condition
B: pellets have, on a portion of the surface thereof, irregularities due to poor dispersion of additives so that they are partially in a poor condition.
C: pellets have, on the whole surface thereof, irregularities due to poor dispersion of additives so that they are in a poor condition.

(7) Copper Deposition Property of Polyamide Resin Composition During Retention in a Molding Machine Supposing that a difference in copper concentration between a molded product (a) obtained by standard molding and a molded product (b) obtained by retention molding is due to deposited copper in a molding machine, the copper deposition property during retention in the molding machine is evaluated based on the following equation:

Copper deposition property during retention in molding machine=(copper concentration of standard molded product (a)−copper concentration of retention molded product (b))×100/copper concentration of standard molded product (a)

The standard molded product (a) and the retention molded product (b) are produced under the following conditions.

(a) Standard molded product: An injection molding machine "PS-40E" manufactured by Nissei Plastic Industries and an ASTM-D638 type mold were used. An injection molded product was obtained by molding under the following conditions: cylinder temperature of 280° C., mold temperature of 80° C., plasticizing stroke of 63 mm, screw speed of 200 rpm, injection time of 10 seconds, and cooling time of 15 seconds. The retention time during plasticization was one minute.

(b) Retention molded product: An injection molding machine "PS-40E" manufactured by Nissei Plastic Industries and an ASTM-D638 type mold were used. An injection molded product was obtained by molding under the following conditions: cylinder temperature of 280° C., mold temperature of 80° C., plasticizing stroke of 63 mm, screw speed of 200 rpm, injection time of 10 seconds, and cooling time of 15 seconds. The retention time during plasticization was 60 minutes.

(8) Long-Term Heat Aging Resistance of Molded Product of Polyamide Resin Composition After the standard molded product (a) obtained above in (7) is treated in a hot-air oven at 180° C. for a predetermined time, its tensile strength is measured in accordance with ASTM-D638. A tensile strength measured after heat treatment relative to a tensile strength measured before heat treatment is calculated as a tensile strength retention percentage and heat treatment time to give a tensile strength retention percentage of 50% is designated as a half-life period.

(9) Color Tone of Molded Product of Polyamide Resin Composition

Color tone of the standard molded product (a) obtained above in (7) is measured using a color meter ("ND-KJ6B", manufactured by Nippon Denshoku).

Examples 1 to 13 and Comparative Examples 1 to 5

Examples 1 to 13 and Comparative Examples 1 to 5 were performed using mixtures of the polyamide, the copper compound, the halogen compound, and the organic compound having at least one amide group produced in the following Production Examples 1 to 13.

Production Example 1

Polyamide 66 (1) in pellet form was obtained by using an aqueous solution (having a concentration of 50 wt. %) of an equimolar salt of hexamethylenediamine and adipic acid and carrying out melt polymerization in a known manner. Polyamide 66 (1) thus obtained had a relative viscosity of 46, a water content of 0.25 wt. %, and a concentration ratio of carboxyl groups of 0.625.

Production Example 2

Polyamide 66 (2) in pellet form was obtained by using an aqueous solution (having a concentration of 50 wt. %) of an equimolar salt of hexamethylenediamine and adipic acid and carrying out melt polymerization in a known manner. Polyamide 66 (2) thus obtained had a relative viscosity of 46, a water content of 0.07 wt. %, and a concentration ratio of carboxyl groups of 0.625.

Production Example 3

Polyamide 66 (3) in pellet form was obtained by using an aqueous solution (having a concentration of 50 wt. %) of an equimolar salt of hexamethylenediamine and adipic acid, adjusting the terminal thereof with adipic acid, and carrying out melt polymerization in a known manner. Polyamide 66 (3) thus obtained had a relative viscosity of 36, a water content of 0.25 wt. %, and a concentration ratio of carboxyl groups of 0.80.

Production Example 4

Polyamide 66 (4) was obtained by uniformly spraying water, with a sprayer, to Polyamide 66(1) obtained in Production Example 1. Polyamide 66 (4) thus obtained had a relative viscosity of 46, a water content of 0.50 wt. %, and a concentration ratio of carboxyl groups of 0.625.

Production Example 5

Polyamide 66 (5) in pellet form was obtained by using an aqueous solution (having a concentration of 50 wt. %) of an equimolar salt of hexamethylenediamine and adipic acid, adjusting the terminal thereof with hexamethylenediamine, and carrying out melt polymerization in a known manner. Polyamide 66 (5) thus obtained had a relative viscosity of 46, a water content of 0.25 wt. %, and a concentration ratio of carboxyl groups of 0.522.

Production Example 6

Polyamide 66 (6) was obtained by uniformly spraying water to Polyamide 66 (1) with a sprayer. Polyamide 66 (6) thus obtained had a relative viscosity of 46, a water content of 2.50 wt. %, and a concentration ratio of carboxyl groups of 0.625.

Production Example 7

Polyamide 66 (7) was obtained by drying Polyamide 66 (1) obtained in Production Example 1 in a nitrogen gas stream of about 80° C. until its water content decreased to a detection limit or less (0.01 wt. % or less). Polyamide 66 (7) thus obtained had a relative viscosity of 46, a water content of less than 0.01 wt. %, and a concentration ratio of carboxyl groups of 0.625.

Production Example 8

A mixture of KI and ethylenebisstearylamide was obtained by mixing 85 parts by weight of KI (having a particle size of from 20 to 200 μm) and 10 parts by weight of ethylenebisstearylamide and grinding the resulting mixture so that the maximum particle size was 20 μm or less. The resulting mixture was mixed thoroughly with 5 parts by weight of CuI (average particle size of 2 μm), followed by granulation with a disk pelletizer ("F5-11-175", product of Fuji Paudal company) to obtain Granules (1).

Production Example 9

A mixture of KI and ethylenebisstearylamide was obtained by mixing 85 parts by weight of KI (having a particle size of from 20 to 200 μm) and 10 parts by weight of ethylenebisstearylamide and then grinding the mixture so that the maximum particle size was 50 μm or less. The resulting mixture was mixed thoroughly with 5 parts by weight of CuI (average particle size of 2 μm), followed by granulation with a disk pelletizer ("F5-11-175", product of Fuji Paudal Company) to obtain Granules (2).

Production Example 10

A mixture of KI and ethylenebisstearylamide was obtained by mixing 75 parts by weight of KI (having a particle size of from 20 to 200 μm) and 10 parts by weight of ethylenebisstearylamide and then grinding the resulting mixture so that the maximum particle size was 20 μm or less. The resulting mixture was mixed thoroughly with 15 parts by weight of CuI (average particle size of 2 μm), followed by granulation with a disk pelletizer ("F5-11-175", product of Fuji Paudal Company) to obtain Granules (3).

Production Example 11

A mixture of KI and ethylenebisstearylamide was obtained by mixing 88 parts by weight of KI (having a particle size of from 20 to 200 μm) and 10 parts by weight of ethylenebisstearylamide and then grinding the resulting mixture so that the maximum particle size was 20 μm or less. The resulting mixture was mixed thoroughly with 2 parts by weight of CuI (average particle size of 2 μm), followed by granulation with a disk pelletizer ("F5-11-175", product of Fuji Paudal Company) to obtain Granules (4).

Production Example 12

A mixture of KI and aluminum distearate was obtained by mixing 85 parts by weight of KI (having a particle size of from 20 to 200 μm) and 10 parts by weight of aluminum distearate (average particle size of 30 μm) and grinding the resulting mixture to have the maximum particle size of 20 μm or less. The resulting mixture was mixed thoroughly with 5 parts by weight of CuI (average particle size of 2 μm), followed by granulation with a disk pelletizer ("F5-11-175", product of Fuji Paudal Company) to obtain Granules (5).

Production Example 13

Without being ground, 85 parts by weight of KI (having a particle size of from 20 to 200 μm) with a maximum particle size of 200 μm and 10 parts by weight of ethylenebisstearylamide were mixed with 5 parts by weight of CuI (average particle size of 2 μm), followed by granulation with a disk pelletizer ("F5-11-175", product of Fuji Paudal Company) to obtain Granules (6).

Example 1

A masterbatch was obtained by mixing 24 parts by weight of Granules (1) obtained in Production Example 8 with 100 parts by weight of Polyamide 66 (1) obtained in Production Example 1 and melt kneading the resulting mixture by using a twin screw extruder (product of PLABOR Co., Ltd., twin screw co-rotation type, L/D=60 (D=30Φ)) under the following conditions: screw speed of 100 rpm and cylinder temperature of 280° C. Evaluation results of it are shown in Table 1.

Example 2

A masterbatch was obtained by mixing 24 parts by weight of Granules (1) obtained in Production Example 8 with 100 parts by weight of Polyamide 66 (2) obtained in Production Example 2 and melt kneading the resulting mixture by using a twin screw extruder in the same way as in Example 1. Evaluation results of it are shown in Table 1.

Example 3

A masterbatch was obtained by mixing 24 parts by weight of Granules (1) obtained in Production Example 8 with 100 parts by weight of Polyamide 66 (3) obtained in Production Example 3 and melt kneading the resulting mixture by using a twin screw extruder in the same way as in Example 1. Evaluation results of it are shown in Table 1.

Example 4

A masterbatch was obtained by mixing 24 parts by weight of Granules (1) obtained in Production Example 8 with 100 parts by weight of Polyamide 66 (4) obtained in Production Example 4 and melt kneading the resulting mixture by using a twin screw extruder in the same way as in Example 1. Evaluation results of it are shown in Table 1.

Example 5

A masterbatch was obtained by mixing 24 parts by weight of Granules (1) obtained in Production Example 8 with 100 parts by weight of Polyamide 66 (5) obtained in Production Example 5 and melt kneading the resulting mixture by using a twin screw extruder in the same way as in Example 1. The melt kneading in the twin screw extruder proceeded stably. Evaluation results of it are shown in Table 1.

Comparative Example 1

A masterbatch was obtained by mixing 24 parts by weight of Granules (1) obtained in Production Example 8 with 100 parts by weight of Polyamide 66 (6) obtained in Production Example 6 and melt kneading the resulting mixture by using a twin screw extruder in the same way as in Example 1. The melt kneading in the twin screw extruder proceeded stably. Evaluation results of it are shown in Table 1.

Comparative Example 2

A masterbatch was obtained by mixing 24 parts by weight of Granules (1) obtained in Production Example 8 with 100 parts by weight of Polyamide 66 (7) obtained in Production Example 7 and melt kneading the resulting mixture by using a twin screw extruder in the same way as in Example 1. The melt kneading in the twin screw extruder proceeded stably. Evaluation results of it are shown in Table 1.

Example 9

A masterbatch was obtained by mixing 24 parts by weight of Granules (3) obtained in Production Example 10 with 100 parts by weight of Polyamide 66 (1) obtained in Production

TABLE 1

| | | Unit | Example 1 | Example 2 | Example 3 | Example 4 | Example 5 | Comp. Ex. 1 | Comp. Ex. 2 |
|---|---|---|---|---|---|---|---|---|---|
| Polyamide | Relative viscosity | | 46 | 46 | 36 | 46 | 46 | 46 | 46 |
| | Water content | Mass % | 0.25 | 0.07 | 0.25 | 0.50 | 0.25 | 2.5 | <0.01 |
| | Concentration ratio of carboxyl groups | | 0.625 | 0.625 | 0.80 | 0.625 | 0.522 | 0.625 | 0.625 |
| | [COOH] concentration | m equivalent/kg | 75 | 75 | 120 | 75 | 60 | 75 | 75 |
| | [NH$_2$] concentration | | 45 | 45 | 30 | 45 | 55 | 45 | 45 |
| Copper compound | Kind | | CuI | CuI | CuI | CuI | CuI | CuI | CuI |
| | Particle size | μm | Average particle size: 2 μm | Average particle size: 2 μm | Average particle size: 2 μm | Average particle size: 2 μm | Average particle size: 2 μm | Average particle size: 2 μm | Average particle size: 2 μm |
| | Amount (based on 100 parts by mass of polyamide) | Parts by mass | 1.2 | 1.2 | 1.2 | 1.2 | 1.2 | 1.2 | 1.2 |
| Halogen compound | Kind | | KI | KI | KI | KI | KI | KI | KI |
| | Particle size | μm | Maximum particle size ≦20 μm | Maximum particle size ≦20 μm | Maximum particle size ≦20 μm | Maximum particle size ≦20 μm | Maximum particle size ≦20 μm | Maximum particle size ≦20 μm | Maximum particle size ≦20 μm |
| | Amount (based on 100 parts by mass of polyamide) | Parts by mass | 20.4 | 20.4 | 20.4 | 20.4 | 20.4 | 20.4 | 20.4 |
| Organic compound | Kind | | EBS* | EBS* | EBS* | EBS* | EBS* | EBS* | EBS* |
| | Amount (based on 100 parts by mass of polyamide) | Parts by mass | 2.4 | 2.4 | 2.4 | 2.4 | 2.4 | 2.4 | 2.4 |
| Masterbatch | Water content | Mass % | 0.25 | 0.25 | 0.25 | 0.25 | 0.25 | 0.25 | 0.25 |
| | I/Cu | Molar ratio | 20.5 | 20.5 | 20.5 | 20.5 | 20.5 | 20.5 | 20.5 |
| | Copper deposition | | A | A | A | A | B | C | C |
| | Metal corrosion | | A | A | A | A | A | C | C |
| | Surface condition of pellets | | Smooth | Smooth | Smooth | Smooth | Smooth | Smooth | Smooth |

EBS*: Ethylenebisstearylamide

It has been found from Table 1 that the masterbatch produced by each of the production methods of the present invention has reduced copper deposition and metal corrosiveness.

Example 6

A masterbatch was obtained by mixing 50 parts by weight of Granules (1) obtained in Production Example 8 with 100 parts by weight of Polyamide 66 (1) obtained in Production Example 1 and melt kneading the resulting mixture in a twin screw extruder in the same way as in Example 1. The melt kneading in the twin screw extruder proceeded stably. Evaluation results of it are shown in Table 2.

Example 7

The masterbatch obtained in Example 1 was dried in a nitrogen gas stream of 80° C. to decrease its water content to 0.10 wt. %. Evaluation results of it are shown in Table 2.

Example 8

A masterbatch was obtained by mixing 24 parts by weight of Granules (2) obtained in Production Example 9 with 100 parts by weight of Polyamide 66 (1) obtained in Production Example 1 and melt kneading the resulting mixture in a twin screw extruder in the same way as in Example 1. The melt kneading in the twin screw extruder proceeded stably. Evaluation results of it are shown in Table 2.

Example 1 and melt kneading the resulting mixture in a twin screw extruder in the same way as in Example 1. The melt kneading in the twin screw extruder proceeded stably. Evaluation results of it are shown in Table 2.

Example 10

A masterbatch was obtained by mixing 24 parts by weight of Granules (4) obtained in Production Example 11 with 100 parts by weight of Polyamide 66 (1) obtained in Production Example 1 and melt kneading the resulting mixture in a twin screw extruder in the same way as in Example 1. The melt kneading in the twin screw extruder proceeded stably. Evaluation results of it are shown in Table 2.

Comparative Example 2-1

A masterbatch was obtained by mixing 24 parts by weight of Granules (6) obtained in Production Example 13 with 100 parts by weight of Polyamide 66 (1) obtained in Production Example 1. Evaluation results of the resulting masterbatch are shown in Table 2.

Comparative Example 3

A masterbatch was obtained by mixing 24 parts by weight of Granules (5) obtained in Production Example 12 with 100 parts by weight of Polyamide 66 (1) obtained in Production Example 1 and melt kneading the resulting mixture in a twin screw extruder in the same way as in Example 1. Evaluation results of it are shown in Table 2.

TABLE 2

|  |  | Unit | Example 6 | Example 7 | Example 8 | Example 9 | Example 10 | Comp. Ex. 2-1 | Comp. Ex. 3 |
|---|---|---|---|---|---|---|---|---|---|
| Polyamide | Relative viscosity |  | 46 | 46 | 46 | 46 | 46 | 46 | 46 |
|  | Water content | Mass % | 0.25 | 0.25 | 0.25 | 0.25 | 0.50 | 0.50 | 0.25 |
|  | Concentration ratio of carboxyl groups |  | 0.625 | 0.625 | 0.625 | 0.625 | 0.625 | 0.625 | 0.625 |
|  | [COOH] concentration | m equivalent/kg | 75 | 75 | 75 | 75 | 75 | 75 | 75 |
|  | [NH$_2$] concentration |  | 45 | 45 | 45 | 45 | 45 | 45 | 45 |
| Copper compound | Kind |  | CuI | CuI | CuI | CuI | CuI | CuI | CuI |
|  | Particle size | μm | Average particle size: 2 μm | Average particle size: 2 μm | Average particle size: 2 μm | Average particle size: 2 μm | Average particle size: 2 μm | Average particle size: 2 μm | Average particle size: 2 μm |
|  | Amount (based on 100 parts by mass of polyamide) | Parts by mass | 2.5 | 1.2 | 1.2 | 3.6 | 0.5 | 1.2 | 1.2 |
| Halogen compound | Kind |  | KI | KI | KI | KI | KI | KI | KI |
|  | Particle size | μm | Maximum particle size ≦20 μm | Maximum particle size ≦20 μm | Maximum particle size ≦50 μm | Maximum particle size ≦20 μm | Maximum particle size ≦20 μm | Maximum particle size 200 μm | Maximum particle size ≦20 μm |
|  | Amount (based on 100 parts by mass of polyamide) | Parts by mass | 42.5 | 20.4 | 20.4 | 18.0 | 21.1 | 20.4 | 20.4 |
| Organic compound | Kind |  | EBS* | EBS* | EBS* | EBS* | EBS* | EBS* | di-AlSt ** |
|  | Amount (based on 100 parts by mass of polyamide) | Parts by mass | 5.0 | 2.4 | 2.4 | 2.4 | 2.4 | 2.4 | 2.4 |
| Master-batch | Water content | Mass % | 0.25 | 0.10 | 0.25 | 0.25 | 0.25 | 0.25 | 0.25 |
|  | I/Cu |  | 20.5 | 20.5 | 20.5 | 6.7 | 10.2 | 20.5 | 20.5 |
|  | Copper deposition |  | A | A | A | A | A | B | C |
|  | Metal corrosion |  | A | A | A | A | A | C | C |
|  | Surface condition of pellets |  | Smooth | Smooth | Smooth | Smooth | Smooth | Irregular | Smooth |

EBS*: Ethylenebisstearylamide
Di-AlSt: aluminum distearate

It has been found from Table 2 that the masterbatch produced by each of the production methods of the present invention has reduced copper deposition and metal corrosiveness. In contrast, in Comparative Example 2-1 using the halogen compound having a maximum particle size of 200 μm, an effect for reducing copper deposition is recognized, but its effect is not sufficient. This suggests that use of a copper compound and a halogen compound each having a smaller maximum particle size brings about a greater effect of the present invention.

Example 12

The masterbatch (2 parts by weight) obtained in Example 1 was mixed with 100 parts by weight of Polyamide 66 (1) obtained in Production Example 1. The resulting mixture was melt kneaded in a twin screw extruder in the same way as in Example 1 to obtain a polyamide resin composition. The resulting composition had 0.0235 part by weight of CuI, 0.396 part by weight of KI, and 0.0470 part by weight of ethylenebisstearylamide, based on 100 parts by weight of Polyamide 66. Evaluation results of the polyamide resin composition are shown in Table 3.

Example 13

The masterbatch (2 parts by weight) obtained in Example 8 was mixed with 100 parts by weight of Polyamide 66 (1) obtained in Production Example 1, followed by melt kneading in a twin screw extruder in the same way as in Example 1 to obtain a polyamide resin composition. Amount of each compound mixed therein was the same as those in Example 11. Evaluation results are shown in Table 3.

Comparative Example 4

The masterbatch (2 parts by weight) obtained in Comparative Example 2 was mixed with 100 parts by weight of Polyamide 66 (1) obtained in Production Example 1, followed by melt kneading in a twin screw extruder in the same way as in Example 1 to obtain a polyamide resin composition. Amount of each compound mixed therein was the same as those in Example 11. Evaluation results are shown in Table 3.

Comparative Example 5

Melt polymerization was performed using an aqueous solution (having a concentration of 50 wt. %) of an equimolar salt of hexamethylenediamine and adipic acid in a known manner. During the polymerization, a mixed aqueous solution of CuI and KI was added. Ethylenebisstearylamide was then added to the surface of Polyamide 66 pellets thus obtained. Amount of each compound mixed therein was the same as those in Comparative Example 2-1. The resulting Polyamide 66 resin composition had a relative viscosity of 46, a water content of 0.10 wt. %, and a concentration ratio of carboxyl groups of 0.625. Evaluation results of it are shown in Table 3.

TABLE 3

| | | Unit | Example 12 | Example 13 | Comp. Ex. 4 | Comp. Ex. 5 |
|---|---|---|---|---|---|---|
| Raw material | Masterbatch | | Masterbatch of Example 1 | Masterbatch of Example 8 | Masterbatch of Comp. Ex. 2 | — |
| Properties of polyamide resin composition | Relative viscosity | | 46 | 46 | 46 | 46 |
| | Water content | Mass % | 0.10 | 0.10 | 0.10 | 0.10 |
| | Tensile elongation | % | 25 | 20 | 25 | 25 |
| | Copper deposition during retention in a molding machine | % | 1.0 | 2.5 | 7.5 | 5.0 |
| | Long-term heat aging resistance | Hr | 700 | 625 | 500 | 600 |
| | Color tone | b value | 1.0 | 1.0 | 3.0 | 2.5 |

It has been found from Table 3 that the molded product of the polyamide resin composition obtained from the masterbatch produced by the production method of the present invention had reduced copper deposition and improved long-term heat aging resistance and color tone.

Examples A1 to A23, Comparative Examples A1 to A17

Examples A1 to A-23, and Comparative Examples A1 to A17 were performed using a mixture of the polyamide, the copper compound, the halogen compound, and the organic compound having at least one amide group produced in Production Examples A1 to A28 described below.

1. Preparation of Polyamide

Production Example A1

A polyamide was prepared by batch polymerization.
As the raw material for Polyamide 66, an equimolar salt of hexamethylenediamine and adipic acid was used. An aqueous solution containing 50 wt. % of the raw material was charged in a polymerization tank. The polymerization tank was purged with nitrogen sufficiently and heated to about 150° C. The raw material was concentrated to about 85% by removing water. The polymerization tank was hermetically sealed. The pressure of the polymerization tank was then raised to about 1.77 MPa in terms of a gauge pressure while increasing the temperature of the polymerization tank to about 210° C. While removing water from the polymerization tank and keeping the pressure at about 1.77 MPa, the temperature was raised from about 210° C. to about 250° C. After having reduced the pressure of the polymerization tank to atmospheric pressure while increasing the temperature to about 280° C. over about 1 hour, the pressure was reduced to about 700 torr over about 10 minutes. The polymerization tank was pressurized with nitrogen and the die at the bottom portion of the polymerization tank was opened to discharge the resulting polymer in pellet form. The pellets were cooled and cut to obtain Polyamide 66 (A1). Polyamide 66 (A1) thus obtained had a relative viscosity of 2.7, a water content of 0.75 wt. %, and a concentration ratio of carboxyl groups of 0.620.

Production Example A2

Polyamide 66 (A2) was obtained by drying Polyamide 66 (A1) obtained in Production Example A1 at about 140° C. for about 0.5 hour in a nitrogen gas stream. Polyamide 66 (A2) thus obtained had a relative viscosity of 2.8, a water content of 0.25 wt. %, and a concentration ratio of carboxyl groups of 0.625.

Production Example A3

Polyamide 66 (A3) was obtained by drying Polyamide 66 (A1) obtained in Production Example A1 at about 90° C. for 1.5 hours in a nitrogen gas stream. Polyamide 66 (A3) thus obtained had a relative viscosity of 2.8, a water content of 0.10 wt. %, and a concentration ratio of carboxyl groups of 0.625.

Production Example A4

Polyamide 66 (A4) was obtained by uniformly spraying, with a sprayer, water to Polyamide 66 (A1) obtained in Production Example A1. By controlling the spraying amount of water, the water content of Polyamide 66 (A4) was adjusted to 1.45 wt. %.

Production Example A5

Polyamide 66 (A5) was obtained by uniformly spraying, with a sprayer, water to Polyamide 66 (A1) obtained in Production Example A1. By controlling the spraying amount of water, the water content of Polyamide 66 (A5) was adjusted to 1.80 wt. %.

Production Example A6

Polyamide 66 (A6) was obtained by drying Polyamide 66 (A1) obtained in Production Example 1 at about 90° C. for about 30 hours in a nitrogen gas stream. Polyamide 66 (A6) thus obtained had a relative viscosity of 2.8, a water content of 0.03 wt. %, and a concentration ratio of carboxyl groups of 0.625.

Production Example A7

Polyamide 66 (A7) was obtained by uniformly spraying, with a sprayer, water to Polyamide 66 (A1) obtained in Production Example A1. By controlling the spraying amount of water, the water content of Polyamide 66 (A7) was adjusted to 2.25 wt. %.

Production Example A8

In the same way as Production Example A1 except that adipic acid was added as a terminal modifier to an aqueous solution (having a concentration of 50 wt. %) of an equimolar salt of hexamethylenediamine and adipic acid, polymerization was performed. Drying was then performed in the same way as in Production Example A2 to yield Polyamide 66 (A8) in pellet form. Polyamide 66 (A8) thus obtained had a relative viscosity of 2.5, a water content of 0.25 wt. %, and a concentration ratio of carboxyl groups of 0.80.

Production Example A9

In the same way as Production Example A1 except that hexamethylenediamine was added as a terminal modifier to an aqueous solution (having a concentration of 50 wt. %) of an equimolar salt of hexamethylenediamine and adipic acid, polymerization was performed. Drying was then performed in the same way as in Production Example A2 to yield Polyamide 66 (A9) in pellet form. Polyamide 66 (A9) thus obtained had a relative viscosity of 3.0, a water content of 0.25 wt. %, and a concentration ratio of carboxyl groups of 0.522.

Production Example A10

A polyamide was produced by continuous polymerization.

As a raw material of Polyamide 66, an equimolar salt of hexamethylenediamine and adipic acid was used. Acetic acid was added as a terminal modifier to an aqueous solution containing 50 wt. % of the raw material.

The resulting mixture was poured in a concentration tank/reactor at a rate of about 3000 Kg/hr to concentrate the mixture to about 90%. The reaction mixture was then discharged in a flasher and the pressure was reduced gradually to atmospheric pressure. The reaction mixture was transferred to another reactor and retained under the conditions of a temperature of about 280° C. and atmospheric pressure or less. The polyamide was extruded into strands. The resulting strands were cooled and cut, and then dried at about 140° C. for about 0.5 hour in a nitrogen gas stream to obtain Polyamide 66 (A10) in pellet form. Polyamide 66 (A10) thus obtained had a relative viscosity of 2.7, a water content of 0.25 wt. %, and a concentration ratio of carboxyl groups of 0.650.

Production Example A11

In the same way as Production Example A10 except that the amount of acetic acid added as a terminal modifier was increased, polymerization and drying were performed to obtain Polyamide 66 (A11). Polyamide 66 (A11) thus obtained had a relative viscosity of 2.8, a water content of 0.11%, and a concentration ratio of carboxyl groups of 0.650.

Production Example A12

In the same way as Production Example A1 except that as the raw material, an equimolar salt of hexamethylenediamine and adipic acid and an equimolar salt of hexamethylenediamine and isophthalic acid were used at a 80/20 weight ratio and adipic acid was added as a terminal modifier to an aqueous mixed solution containing 50 wt. % of the raw material, polymerization was performed. Then, in the same way to Production Example A2, drying was performed, Polyamide 66/61 (A12) was obtained in pellet form. Polyamide 66/61 (A12) thus obtained had a relative viscosity of 2.3, a water content of 0.25 wt. %, and a concentration ratio of carboxyl groups of 0.735.

2. Preparation of Mixture of Copper Compound, Halogen Compound, and Organic Compound Having at Least One Amide Group

Production Example A13

A mixture of KI and ethylenebisstearylamide was obtained by mixing 85 parts by weight of KI (having a particle size of from 20 to 200 μm) and 10 parts by weight of ethylenebisstearylamide, one of bisamides, and grinding the resulting mixture so that the maximum particle size of KI was 20 μm. The mixture thus obtained was mixed well with 5 parts by weight of CuI (average particle size: 2 μm) and the resulting mixture was granulated by a disk pelletizer ("F5-11-175", product of Fuji Paudal Company) to obtain Granules (A1).

Production Example A14

A mixture of KI and ethylenebisstearylamide was obtained by mixing 75 parts by weight of KI (having a particle size of from 20 to 200 μm) and 10 parts by weight of ethylenebisstearylamide and grinding the resulting mixture so that the maximum particle size of KI was 20 μm. The resulting mixture was mixed well with 15 parts by weight of CuI (average particle size: 2 μm) and the resulting mixture was granulated by a disk pelletizer ("F5-11-175", product of Fuji Paudal Company) to obtain Granules (A2).

Production Example A15

A mixture of KI and ethylenebisstearylamide was obtained by mixing 88 parts by weight of KI (having a particle size of from 20 to 200 μm) and 10 parts by weight of ethylenebisstearylamide and grinding the resulting mixture so that the maximum particle size of KI was 20 μm. The mixture was mixed well with 2 parts by weight of CuI (average particle size: 2 μm) and the resulting mixture was granulated by a disk pelletizer ("F5-11-175", product of Fuji Paudal Company) to obtain Granules (A3).

Production Example A16

A mixture of KI and ethylenebisstearylamide was obtained by mixing 70 parts by weight of KI (having a particle size of from 20 to 200 μm) and 20 parts by weight of ethylenebisstearylamide and grinding the resulting mixture so that the maximum particle size of KI was 20 μm. The mixture thus obtained was mixed well with 10 parts by weight of CuI (average particle size of 2 μm) and the resulting mixture was granulated by a disk pelletizer ("F5-11-175", product of Fuji Paudal Company) to obtain Granules (A4).

Production Example A17

Mixture (A1) was obtained by mixing 85 parts by weight of KI (having a particle size of from 20 to 200 μm), 10 parts by weight of ethylenebisstearylamide (average particle size of 30 μm), and 5 parts by weight of CuI (average particle size of 2 μm) and grinding the resulting mixture thoroughly so that the maximum particle size of KI was 20 μm.

Production Example A18

A mixture of KI and ethylenebisstearylamide was obtained by mixing 85 parts by weight of KI (having a particle size of from 20 to 200 μm) and 10 parts by weight of ethylenebisstearylamide and grinding the resulting mixture so that the maximum particle size of KI was 50 μm. The mixture thus obtained was mixed well with 5 parts by weight of CuI (average particle size of 2 μm) and the resulting mixture was granulated by a disk pelletizer ("F5-11-175", product of Fuji Paudal Company) to obtain Granules (A5).

Production Example A19

A mixture of KI and ethylenebisstearylamide was obtained by mixing 85 parts by weight of KI (having a particle size of from 20 to 200 μm) and 10 parts by weight of ethylenebisstearylamide and grinding the resulting mixture so that the maximum particle size of KI was 75 μm. The mixture was mixed well with 5 parts by weight of CuI (average particle size of 2 μm) and the resulting mixture was granulated by a disk pelletizer ("F5-11-175", product of Fuji Paudal Company) to obtain Granules (A6).

Production Example A20

Without being ground, 85 parts by weight of KI (having a particle size of from 20 to 200 μm) with a maximum particle size of 200 μm and 10 parts by weight of ethylenebisstearylamide were mixed with 5 parts by weight of CuI (average particle size of 2 μm), and the resulting mixture was granulated by a disk pelletizer ("F5-11-175", product of Fuji Paudal) to obtain Granules (A7).

Production Example A21

85 parts by weight of KI (having a particle size of from 20 to 200 μm), 10 parts by weight of ethylenebisstearylamide, and 5 parts by weight of CuI (average particle size of 2 μm) were mixed and the resulting mixture was ground by using a grinder with a 100 mesh (about 130 μm as a maximum particle size) screen at a maximum to obtain Mixture (A2).

Production Example A22

A mixture of KI and stearylerucic acid amide was obtained by mixing 85 parts by weight of KI (having a particle size of from 20 to 200 μm) and 10 parts by weight of N-stearylerucic acid amide (average particle size of 100 μm) one of substituted amides, and grinding the resulting mixture so that the maximum particle size of KI was 20 μm or less. The mixture was mixed well with 5 parts by weight of CuI (average particle size of 2 μm) and the resulting mixture was granulated by a disk pelletizer ("F5-11-175", product of Fuji Paudal Company) to obtain Granules (A8).

Production Example A23

A mixture of KI and stearic acid amide was obtained by mixing 85 parts by weight of KI (having a particle size of from 20 to 200 μm) and 10 parts by weight of stearic acid amide (average particle size of 20 μm), one of monoamides, and grinding the resulting mixture so that the maximum particle size of KI was 20 μm or less. The mixture was mixed well with 5 parts by weight of CuI (average particle size: 2 μm) and the resulting mixture was granulated by a disk pelletizer ("F5-11-175", product of Fuji Paudal Company) to obtain Granules (A9).

Production Example A24

A mixture of KI and methyloisteric acid amide was obtained by mixing 85 parts by weight of KI (having a particle size of from 20 to 200 μm) and 10 parts by weight of methylolstearic acid amide (average particle size of 30 μm), one of methylolamides, and grinding the resulting mixture so that the maximum particle size of KI was 20 μm or less. The mixture was mixed well with 5 parts by weight of CuI (average particle size of 2 μm) and the resulting mixture was granulated by a disk pelletizer ("F5-11-175", product of Fuji Paudal Company) to obtain Granules (A10).

Production Example A25

A mixture of KI and stearic acid was obtained by mixing 85 parts by weight of KI (having a particle size of from 20 to 200 μm) and 10 parts by weight of stearic acid (average particle size of 30 μm), one of higher fatty acids, and grinding the resulting mixture so that the maximum particle size of KI was 20 μm or less. The mixture was mixed well with 5 parts by weight of CuI (average particle size of 2 μm) and the resulting mixture was granulated by a disk pelletizer ("F5-11-175", product of Fuji Paudal Company) to obtain Granules (A11).

Production Example A26

A mixture of KI and stearyl stearate was obtained by mixing 85 parts by weight of KI (having a particle size of from 20 to 200 μm) and 10 parts by weight of stearyl stearate (average particle size of 30 μm), one of higher fatty acid esters, and grinding the resulting mixture so that the maximum particle size of KI was 20 μm or less. The mixture was mixed well with 5 parts by weight of CuI (average particle size of 2 μm) and the resulting mixture was granulated by a disk pelletizer ("F5-11-175", product of Fuji Paudal Company) to obtain Granules (A12).

Production Example A27

A mixture of KI and calcium montanate was obtained by mixing 85 parts by weight of KI (having a particle size of from 20 to 200 μm) and 10 parts by weight of calcium montanate (average particle size of 30 μm), one of higher fatty acid metal salts, and grinding the resulting mixture so that the maximum particle size of KI was 20 μm or less. The mixture was mixed well with 5 parts by weight of CuI (average particle size of 2 μm) and the resulting mixture was granulated by a disk pelletizer ("F5-11-175", product of Fuji Paudal Company) to obtain into Granules (A13).

Production Example A28

A mixture of KI and aluminum stearate was obtained by mixing 85 parts by weight of KI (having a particle size of from 20 to 200 μm) and 10 parts by weight of aluminum stearate (average particle size of 30 μm), one of higher fatty acid metal salts, and grinding the resulting mixture so that the maximum particle size of KI was 20 μm or less. The mixture was mixed well with 5 parts by weight of CuI (average particle size: 2 μm) and the resulting mixture was granulated by a disk pelletizer ("F5-11-175", product of Fuji Paudal Company) to obtain Granules (A14).

3. Examples A1 to A10 and Comparative Examples A1 and A2

Masterbatches of Examples A1 to A10, and Comparative Examples A1 and A2 were produced by changing the kind of a polyamide used for the production.

Example A1

A masterbatch was obtained by mixing 100 parts by weight of Polyamide 66 (A1) obtained in Production Example A1 with 24 parts by weight of Granules (A1) obtained in Production Example 13, and melt kneading the resulting mixture using a twin screw extruder (product of PLABOR Co., Ltd., twin screw co-rotation type, L/D=60 (D=30Φ)) under the following conditions: a screw speed of 100 rpm and a cylinder temperature of 280° C. The melt kneading in the twin screw extruder proceeded stably. The color of the masterbatch thus obtained was white and good. Evaluation results of it are shown in Table 4.

Example A2

In the same way as Example A1 except that the use of Polyamide 66 (A2) obtained in Production Example A2 was used instead of Polyamide 66 (A1), a masterbatch was obtained. The melt kneading in the twin screw extruder proceeded stably. The color of the masterbatch thus obtained was white and good. Evaluation results of it are shown in Table 4.

Example A3

In the same way as Example A1 except that Polyamide 66 (A3) obtained in Production Example A3 was used instead of Polyamide 66 (A1), a masterbatch was obtained. The melt kneading in the twin screw extruder proceeded stably. The color of the masterbatch thus obtained was white and good. Evaluation results of it are shown in Table 4.

Example A4

In the same way as Example A1 except that Polyamide 66 (A4) obtained in Production Example A4 was used instead of Polyamide 66 (A1), a masterbatch was obtained. The melt kneading in the twin screw extruder proceeded stably. The color of the masterbatch thus obtained was white and good. Evaluation results are shown in Table 4.

Example A5

In the same way as Example A1 except that Polyamide 66 (A5) obtained in Production Example A5 was used instead of Polyamide 66 (A1), a masterbatch was obtained. The melt kneading in the twin screw extruder proceeded stably. The color of the masterbatch thus obtained was white and good. Evaluation results of it are shown in Table 4.

Comparative Example A1

In the same way as Example A1 except that Polyamide 66 (A6) obtained in Production Example A6 was used instead of Polyamide 66 (A1), a masterbatch was obtained. The melt kneading in a twin screw extruder proceeded stably. The masterbatch thus obtained got discolored in yellow. Evaluation results of it are shown in Table 4.

Comparative Example A2

In the same way as Example A1 except that Polyamide 66 (A7) obtained in Production Example A7 was used instead of Polyamide 66 (A1), a masterbatch was obtained. The melt kneading in a twin screw extruder proceeded stably. The masterbatch thus obtained got slightly discolored in yellow. Evaluation results of it are shown in Table 4.

Example A6

In the same way as Example A1 except that Polyamide 66 (A8) obtained in Production Example A8 was used instead of Polyamide 66 (A1), a masterbatch was obtained. The melt kneading in a twin screw extruder proceeded stably. The color of the masterbatch thus obtained was white and good. Evaluation results of it are shown in Table 4.

Example A7

In the same way as Example A1 except that Polyamide 66 (A9) obtained in Production Example A9 was used instead of Polyamide 66 (A1), a masterbatch was obtained. The melt kneading in a twin screw extruder proceeded stably. The color of the masterbatch thus obtained was white and good. Evaluation results of it are shown in Table 5.

Example A8

In the same way as Example A1 except that Polyamide 66 (A10) obtained in Production Example A10 was used instead of Polyamide 66 (A1), a masterbatch was obtained. The melt kneading in a twin screw extruder proceeded stably. The color of the masterbatch thus obtained was white and good. Evaluation results are shown in Table 5.

Example A9

In the same way as Example A1 except that Polyamide 66 (A11) obtained in Production Example A11 was used instead of Polyamide 66 (A1), a masterbatch was obtained. The melt kneading in a twin screw extruder proceeded stably. The color of the masterbatch thus obtained was white and good. Evaluation results of it are shown in Table 5.

Example A10

In the same way as Example A1 except that Polyamide 66/61 (1) obtained in Production Example A12 was used instead of Polyamide 66 (A1), a masterbatch was obtained. The melt kneading in a twin screw extruder proceeded stably. The color of the masterbatch thus obtained was white and good. Evaluation results of it are shown in Table 5.

TABLE 4

| | | | | Masterbatch | | | | | |
|---|---|---|---|---|---|---|---|---|---|
| | | Unit | Example A1 | Example A2 | Example A3 | Example A4 | Example A5 | Comp. Ex. A1 | Comp. Ex. 2A |
| Polyamide | Relative viscosity ($\eta r$) | | 2.7 | 2.8 | 2.8 | 2.7 | 2.7 | 2.8 | 2.7 |
| | Water content | Weight % | 0.75 | 0.25 | 0.10 | 1.45 | 1.80 | 0.03 | 2.25 |
| | Concentration ratio of carboxyl groups | | 0.620 | 0.625 | 0.625 | 0.620 | 0.620 | 0.625 | 0.620 |

TABLE 4-continued

| | | Unit | Example A1 | Example A2 | Example A3 | Example A4 | Example A5 | Comp. Ex. A1 | Comp. Ex. 2A |
|---|---|---|---|---|---|---|---|---|---|
| | [COOH] concentration | m equivalent/ kg | 78 | 75 | 75 | 78 | 78 | 75 | 78 |
| | [NH$_2$] concentration | | 48 | 45 | 45 | 48 | 48 | 45 | 48 |
| Copper compound | Kind | | CuI | CuI | CuI | CuI | CuI | CuI | CuI |
| | Maximum particle size | μm | 2 | 2 | 2 | 2 | 2 | 2 | 2 |
| | Amount (based on 100 parts by weight of polyamide) | Parts by weight | 1.2 | 1.2 | 1.2 | 1.2 | 1.2 | 1.2 | 1.2 |
| Halogen compound | Kind | | KI | KI | KI | KI | KI | KI | KI |
| | Particle size | μm | 20 | 20 | 20 | 20 | 20 | 20 | 20 |
| | Amount (based on 100 parts by weight of polyamide) | Parts by weight | 20.2 | 20.2 | 20.2 | 20.2 | 20.2 | 20.2 | 20.2 |
| Organic compound | Kind | | EBS* | EBS* | EBS* | EBS* | EBS* | EBS* | EBS* |
| | Amount (based on 100 parts by weight of polyamide) | Parts by weight | 2.4 | 2.4 | 2.4 | 2.4 | 2.4 | 2.4 | 2.4 |
| Masterbatch | Water content | Weight % | 0.25 | 0.25 | 0.25 | 0.25 | 0.25 | 0.25 | 0.25 |
| | I/Cu | Molar ratio | 20.5 | 20.5 | 20.5 | 20.5 | 20.5 | 20.5 | 20.5 |
| | Copper deposition | | A | A | A | A | B | C | B |
| | Metal corrosiveness | | A | A | A | A | B | B | C |
| | Surface condition of pellets | | A | A | A | A | A | B | A |

EBS*: Ethylenebisstearylamide

TABLE 5

| | | Unit | Example A6 | Example A7 | Example A8 | Example A9 | Example A10 |
|---|---|---|---|---|---|---|---|
| Polyamide | Relative viscosity (ηr) | | 2.5 | 3.0 | 2.7 | 2.8 | 2.3 |
| | Water content | Weight % | 0.25 | 0.25 | 0.25 | 0.11 | 0.25 |
| | Concentration ratio of carboxyl groups | | 0.80 | 0.522 | 0.650 | 0.650 | 0.735 |
| | [COOH] concentration | m equivalent/ kg | 120 | 60 | 78 | 75 | 125 |
| | [NH$_2$] concentration | | 30 | 55 | 42 | 40 | 45 |
| Copper compound | Kind | | CuI | CuI | CuI | CuI | CuI |
| | Maximum particle size | μm | 2 | 2 | 2 | 2 | 2 |
| | Amount (based on 100 parts by weight of polyamide) | Parts by weight | 1.2 | 1.2 | 1.2 | 1.2 | 1.2 |
| Halogen compound | Kind | | KI | KI | KI | KI | KI |
| | Maximum particle size | μm | 20 | 20 | 20 | 20 | 20 |
| | Amount (based on 100 parts by weight of polyamide) | Parts by weight | 20.2 | 20.2 | 20.2 | 20.2 | 20.2 |
| Organic compound | Kind | | EBS* | EBS* | EBS* | EBS* | EBS* |
| | Amount (based on 100 parts by weight of polyamide) | Parts by weight | 2.4 | 2.4 | 2.4 | 2.4 | 2.4 |
| Masterbatch | Water content | Weight % | 0.25 | 0.25 | 0.25 | 0.25 | 0.25 |
| | I/Cu | Molar ratio | 20.5 | 20.5 | 20.5 | 20.5 | 20.5 |
| | Copper deposition | | A | B | A | A | A |
| | Metal corrosiveness | | B | A | A | A | A |
| | Surface condition of pellets | | A | A | A | A | A |

EBS*: Ethylenebisstearylamide

From Tables 4 and 5, it has been confirmed that by adjusting the water content of the polyamide used for the production of a masterbatch to fall within the range specified by the present invention, the resulting masterbatch has improved color tone and reduced copper deposition and metal corrosiveness.

4. Examples A11 to A19 and Comparative Examples A3 to A10

Masterbatches of Examples A11 to A19 and Comparative Examples A3 to A10 were produced by changing the kinds of the copper compound, the halogen compound, and the organic compound having at least one amide group.

Example A11

A masterbatch was obtained by mixing 100 parts by weight of Polyamide 66 (A2) obtained in Production Example A2 with 24 parts by weight of Granules (A2) obtained in Production Example A14 and then, melt kneading the resulting mixture in a twin screw extruder in the same way as in Example A1. The melt kneading in the twin screw extruder proceeded stably. The color of the masterbatch thus obtained was white and good. Evaluation results of it are shown in Table 6.

Example A12

A masterbatch was obtained by mixing 100 parts by weight of Polyamide 66 (A2) obtained in Production Example A2 with 24 parts by weight of Granules (A3) obtained in Production Example A15 and then, melt kneading the resulting mixture in a twin screw extruder in the same way as in Example A1. The melt kneading in the twin screw extruder proceeded stably. The color of the masterbatch thus obtained was white and good. Evaluation results of it are shown in Table 6.

Example A13

A masterbatch was obtained by mixing 100 parts by weight of Polyamide 66 (A2) obtained in Production Example A2 with 24 parts by weight of Granules (A4) obtained in Production Example A16 and then, melt kneading the resulting mixture in a twin screw extruder in the same way as in Example A1. The melt kneading in the twin screw extruder proceeded stably. The color of the masterbatch thus obtained was white and good. Evaluation results are shown in Table 6.

Example A14

A masterbatch was obtained by mixing 100 parts by weight of Polyamide 66 (A2) obtained in Production Example A2 with 50 parts by weight of Granules (A4) obtained in Production Example A16 and then, melt kneading in a twin screw extruder in the same way as in Example A1. Although partial strand breakage occurred fairly infrequently, the melt kneading proceeded without hindrance. The color of the masterbatch thus obtained was white and good. Evaluation results of it are shown in Table 6.

Comparative Example A3

A masterbatch was tried to produce by mixing 100 parts by weight of Polyamide 66 (A2) obtained in Production Example A2 with 75 parts by weight of Granules (A4) obtained in Production Example A16 and then, melt kneading the resulting mixture in a twin screw extruder in the same way as in Example A1. However, strand breakage occurred frequently during melt kneading in the twin screw extruder, resulting in a failure to produce a masterbatch. Evaluation results of it are shown in Table 6.

Example A15

A masterbatch was obtained by mixing 100 parts by weight of Polyamide 66 (A2) obtained in Production Example A2 with 24 parts by weight of Mixture (A1) obtained in Production Example A17 and then, melt kneading the resulting mixture in a twin screw extruder in the same way as in Example A1. The melt kneading in the twin screw extruder proceeded stably. The color of the masterbatch thus obtained was white and good. Evaluation results are shown in Table 7.

Example A16

A masterbatch was obtained by mixing 100 parts by weight of Polyamide 66 (A2) obtained in Production Example A2 with 24 parts by weight of Granules (A5) obtained in Production Example A18 and then, melt kneading the resulting mixture in a twin screw extruder in the same way as in Example A1. The melt kneading in the twin screw extruder proceeded stably. The color of the masterbatch thus obtained was white and good. Evaluation results are shown in Table 7.

Comparative Example A4

A masterbatch was obtained by mixing 100 parts by weight of Polyamide 66 (A2) obtained in Production Example A2 with 24 parts by weight of Granules (A6) obtained in Production Example A19 and then, melt kneading the resulting mixture in a twin screw extruder in the same way as in Example A1. Strand breakage occurred partially, which made the melt kneading in the twin screw extruder unstable. The masterbatch thus obtained got slightly discolored in yellow. Evaluation results of it are shown in Table 7.

Comparative Example A5

A masterbatch was tried to produce by mixing 100 parts by weight of Polyamide 66 (A2) obtained in Production Example A2 with 24 parts by weight of Granules (A7) obtained in Production Example A20 and then, melt kneading the resulting mixture in a twin screw extruder in the same way as in Example A1. Strand breakage occurred frequently during the melt kneading in the twin screw extruder, which hindered the melt kneading operation. Evaluation results of it are shown in Table 7.

Comparative Example A6

A masterbatch was obtained by mixing 100 parts by weight of Polyamide 66 (A2) obtained in Production Example A2 with 24 parts by weight of Mixture (A2) obtained in Production Example A21 and then, melt kneading the resulting mixture in a twin screw extruder in the same way as in Example A1.

Strand breakage occurred frequently, which made the melt kneading in the twin screw extruder unstable. Evaluation results of it are shown in Table 7.

Example A17

A masterbatch was obtained by mixing 100 parts by weight of Polyamide 66 (A2) obtained in Production Example A2 with 24 parts by weight of Granules (A8) obtained in Production Example A22 and then, melt kneading in a twin screw extruder in the same way as in Example A1. The melt kneading in the twin screw extruder proceeded stably. The color of the masterbatch thus obtained was white and good. Evaluation results of it are shown in Table 8.

Example A18

A masterbatch was obtained by mixing 100 parts by weight of Polyamide 66 (A2) obtained in Production Example A2 with 24 parts by weight of Granules (A9) obtained in Production Example A23 and then, melt kneading the resulting mixture in a twin screw extruder in the same way as in Example A1. The melt kneading in the twin screw extruder proceeded stably. The color of the masterbatch thus obtained was white and good. Evaluation results of it are shown in Table 8.

Example A19

A masterbatch was obtained by mixing 100 parts by weight of Polyamide 66 (A2) obtained in Production Example A2 with 24 parts by weight of Granules (A10) obtained in Production Example A24 and then, melt kneading the resulting mixture in a twin screw extruder in the same way as in Example A1.

The melt kneading in the twin screw extruder proceeded stably. The color of the masterbatch thus obtained was white and good. Evaluation results of it are shown in Table 8.

Comparative Example A7

A masterbatch was obtained by mixing 100 parts by weight of Polyamide 66 (A2) obtained in Production Example A2 with 24 parts by weight of Granules (A11) obtained in Production Example A25 and then, melt kneading the resulting mixture in a twin screw extruder in the same way as in Example A1. The melt kneading in the twin screw extruder proceeded stably. The masterbatch thus obtained got slightly discolored in yellow. Evaluation results of it are shown in Table 8.

Comparative Example A8

A masterbatch was obtained by mixing 100 parts by weight of Polyamide 66 (A2) obtained in Production Example A2 with 24 parts by weight of Granules (A12) obtained in Production Example A26 and then, melt kneading the resulting mixture in a twin screw extruder in the same way as in Example A1. The melt kneading in the twin screw extruder proceeded stably. The masterbatch thus obtained got slightly discolored in yellow. Evaluation results of it are shown in Table 8.

Comparative Example A9

A masterbatch was obtained by mixing 100 parts by weight of Polyamide 66 (A2) obtained in Production Example A2 with 24 parts by weight of Granules (A13) obtained in Production Example A27 and then, melt kneading the resulting mixture in a twin screw extruder in the same way as in Example A1. The melt kneading in the twin screw extruder proceeded stably. The masterbatch thus obtained got slightly discolored in yellow. Evaluation results of it are shown in Table 8.

Comparative Example A10

A masterbatch was obtained by mixing 100 parts by weight of Polyamide 66 (A2) obtained in Production Example A2 with 24 parts by weight of Granules (A14) obtained in Production Example A28 and then, melt kneading the resulting mixture in a twin screw extruder in the same way as in Example A1. The melt kneading in the twin screw extruder proceeded stably. The masterbatch thus obtained got slightly discolored in yellow. Evaluation results of it are shown in Table 8.

TABLE 6

| | | | Masterbatch | | | | |
| --- | --- | --- | --- | --- | --- | --- | --- |
| | | Unit | Example A11 | Example A12 | Example A13 | Example A14 | Comp. Ex. A3 |
| Polyamide | Relative viscosity (ηr) | | 2.8 | 2.8 | 2.8 | 2.8 | 2.8 |
| | Water content | Weight % | 0.25 | 0.25 | 0.25 | 0.25 | 0.25 |
| | Concentration ratio of carboxyl groups | | 0.625 | 0.625 | 0.625 | 0.625 | 0.625 |
| | [COOH] concentration | m equivalent/ | 75 | 75 | 75 | 75 | 75 |
| | [NH$_2$] concentration | kg | 45 | 45 | 45 | 45 | 45 |
| Copper compound | Kind | | CuI | CuI | CuI | CuI | CuI |
| | Maximum particle size | μm | 2 | 2 | 2 | 2 | 2 |
| | Amount (based on 100 parts by weight of polyamide) | Parts by weight | 3.6 | 0.48 | 2.4 | 5.0 | 7.5 |
| Halogen compound | Kind | | KI | KI | KI | KI | KI |
| | Maximum particle size | μm | 20 | 20 | 20 | 20 | 20 |
| | Amount (based on 100 parts by weight of polyamide) | Parts by weight | 18.0 | 21.1 | 16.8 | 35.0 | 52.5 |
| Organic compound | Kind | | EBS* | EBS* | EBS* | EBS* | EBS* |
| | Amount (based on 100 parts by weight of polyamide) | Parts by weight | 2.4 | 2.4 | 4.8 | 10.0 | 15.0 |
| Masterbatch | Water content | Weight % | 0.25 | 0.25 | 0.25 | 0.25 | Failure in melt mixing |
| | I/Cu | Molar ratio | 6.7 | 51.5 | 9.0 | 9.0 | |
| | Copper deposition | | A | A | A | B | |
| | Metal corrosiveness | | A | B | A | B | |
| | Surface condition of pellets | | A | A | A | A | |

EBS*: Ethylenebisstearylamide

TABLE 7

| | | | Masterbatch | | | | |
| --- | --- | --- | --- | --- | --- | --- | --- |
| | | Unit | Example A15 | Example A16 | Comp. Ex. A4 | Comp. Ex. A5 | Comp. Ex. A6 |
| Polyamide | Relative viscosity (ηr) | | 2.8 | 2.8 | 2.8 | 2.8 | 2.8 |
| | Water content | Weight % | 0.25 | 0.25 | 0.25 | 0.25 | 0.25 |
| | Concentration ratio of carboxyl groups | | 0.625 | 0.625 | 0.625 | 0.625 | 0.625 |
| | [COOH] concentration | m equivalent/ | 75 | 75 | 75 | 75 | 75 |
| | [NH$_2$] concentration | kg | 45 | 45 | 45 | 45 | 45 |
| Copper compound | Kind | | CuI | CuI | CuI | CuI | CuI |
| | Maximum particle size | μm | 2 | 2 | 2 | 2 | 2 |
| | Amount (based on 100 parts by weight of polyamide) | Parts by weight | 1.2 | 1.2 | 1.2 | 1.2 | 1.2 |
| Halogen compound | Kind | | KI | KI | KI | KI | KI |
| | Maximum particle size | μm | 20 | 50 | 75 | 200 | 130 |
| | Amount (based on 100 parts by weight of polyamide) | Parts by weight | 20.2 | 20.2 | 20.2 | 20.2 | 20.2 |

TABLE 7-continued

Masterbatch

| | | Unit | Example A15 | Example A16 | Comp. Ex. A4 | Comp. Ex. A5 | Comp. Ex. A6 |
|---|---|---|---|---|---|---|---|
| Organic compound | Kind | | EBS* | EBS* | EBS* | EBS* | EBS* |
| | Amount (based on 100 parts by weight of polyamide) | Parts by weight | 2.4 | 2.4 | 2.4 | 2.4 | 2.4 |
| Master-batch | Water content | Weight % | 0.25 | 0.25 | 0.25 | Failure in melt mixing | 0.25 |
| | I/Cu | Molar ratio | 20.5 | 20.5 | 20.5 | | 20.5 |
| | Copper deposition | | A | A | B | | C |
| | Metal corrosiveness | | A | B | C | | C |
| | Surface condition of pellets | | A | A | B | | C |

EBS*: Ethylenebisstearylamide

TABLE 8

Masterbatch

| | | Unit | Example A17 | Example A18 | Example A19 | Comp. Ex. A7 | Comp. Ex. A8 | Comp. Ex. A9 | Comp. Ex. A10 |
|---|---|---|---|---|---|---|---|---|---|
| Polyamide | Relative viscosity (ηr) | | 2.8 | 2.8 | 2.8 | 2.8 | 2.8 | 2.8 | 2.8 |
| | Water content | Weight % | 0.25 | 0.25 | 0.25 | 0.25 | 0.25 | 0.25 | 0.25 |
| | Concentration ratio of carboxyl groups | | 0.625 | 0.625 | 0.625 | 0.625 | 0.625 | 0.625 | 0.625 |
| | [COOH] concentration | m equivalent/kg | 75 | 75 | 75 | 75 | 75 | 75 | 75 |
| | [NH$_2$] concentration | | 45 | 45 | 45 | 45 | 45 | 45 | 45 |
| Copper compound | Kind | | CuI | CuI | CuI | CuI | CuI | CuI | CuI |
| | Maximum particle size | μm | 2 | 2 | 2 | 2 | 2 | 2 | 2 |
| | Amount (based on 100 parts by weight of polyamide) | Parts by weight | 1.2 | 1.2 | 1.2 | 1.2 | 1.2 | 1.2 | 1.2 |
| Halogen compound | Kind | | KI | KI | KI | KI | KI | KI | KI |
| | Maximum particle size | μm | 20 | 20 | 20 | 20 | 20 | 20 | 20 |
| | Amount (based on 100 parts by weight of polyamide) | Parts by weight | 20.2 | 20.2 | 20.2 | 20.2 | 20.2 | 20.2 | 20.2 |
| Organic compound | Kind | | N-stearylerucic acid amide | Stearic acid amide | Methylolstearic acid amide | Stearic acid | Stearyl stearate | Calcium montanate | Aluminum stearate |
| | Amount (based on 100 parts by weight of polyamide) | Parts by weight | 2.4 | 2.4 | 2.4 | 2.4 | 2.4 | 2.4 | 2.4 |
| Master-batch | Water content | Weight % | 0.25 | 0.25 | 0.25 | 0.25 | 0.25 | 0.25 | 0.25 |
| | I/Cu | Molar ratio | 20.5 | 20.5 | 20.5 | 20.5 | 20.5 | 20.5 | 20.5 |
| | Copper deposition | | A | A | A | C | C | C | C |
| | Metal corrosiveness | | A | A | A | C | C | C | C |
| | Surface condition of pellets | | A | A | A | A | A | A | A |

From Tables 6 to 8, it has been confirmed that in the method for producing a masterbatch according to the present invention which uses a polyamide having a water content adjusted to fall within a range specified by the present invention, the production stability, color tone, copper deposition property, and metal corrosiveness of the masterbatch and the surface conditions of the masterbatch pellets are improved by optimizing the maximum particle size of the halogen compound and the kind of the organic compound.

5. Examples A20 to A23 and Comparative Examples A11 to A17

Polyamide resin compositions were produced by mixing a second polyamide with a masterbatch Example A20

The masterbatch (2 parts by weight) obtained in Example A1 wad added to 100 parts by weight of Polyamide 66 (A2) obtained in Production Example A2. In the same way as in Example A1, the resulting mixture was melt kneaded in a twin screw extruder to obtain a polyamide resin composition, The resulting polyamide resin composition contained, based on 100 parts by weight of Polyamide 66, 0.0235 part by weight of CuI, 0.396 part by weight of KI, and 0.470 part by weight of ethylenebisstearylamide. Evaluation results of it are shown in Table 9.

Example A21

The master batch (2 parts by weight) obtained in Example A16 was added to 100 parts by weight of Polyamide 66 (A2) obtained in Production Example A2. In the same way as in Example A1, the resulting mixture was melt kneaded in a twin screw extruder to obtain a polyamide resin composition.
The resulting polyamide resin composition contained each compound in the same amount as that of the polyamide resin composition obtained in Example A20. Evaluation results of it are shown in Table 9.

Example A22

The masterbatch (2 parts by weight) obtained in Example A1 was added to 100 parts by weight of Polyamide 66 (A1) obtained in Production Example A1. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results of it are shown in Table 9.

Example A23

The masterbatch (0.67 part by weight) obtained in Example A11 was added to 100 parts by weight of Polyamide 66 (A2) obtained in Production Example A2. In the same way as in Example A1, the resulting mixture was melt kneaded in a twin screw extruder to obtain a polyamide resin composition. The resulting polyamide resin composition contained, based on 100 parts by weight of Polyamide 66, 0.0240 part by weight of CuI, 0.120 part by weight of KI, and 0.0160 part by weight of ethylenebisstearylamide. Evaluation results of it are shown in Table 9.

Comparative Example A11

The masterbatch (2 parts by weight) obtained in Comparative Example A1 was added to 100 parts by weight of Polyamide 66 (A2) obtained in Production Example A2. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results of it are shown in Table 10.

Comparative Example A12

The masterbatch (2 parts by weight) obtained in Comparative Example A2 was added to 100 parts by weight of Polyamide 66 (A2) obtained in Production Example A2. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results of it are shown in Table 10.

Comparative Example A13

The masterbatch (2 parts by weight) obtained in Comparative Example A4 was added to 100 parts by weight of Polyamide 66 (A2) obtained in Production Example A2. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results are shown in Table 10.

Comparative Example A14

The masterbatch (2 parts by weight) obtained in Comparative Example A6 was added to 100 parts by weight of Polyamide 66 (A2) obtained in Production Example A2. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results of it are shown in Table 10.

Comparative Example A15

The masterbatch (2 parts by weight) obtained in Comparative Example A9 was added to 100 parts by weight of Polyamide 66 (A) obtained in Production Example A2. In the same way as in Example A1, the resulting mixture was melt kneaded in a twin screw extruder to obtain a polyamide resin composition. The resulting polyamide resin composition contained each compound in the same amount as that of the polyamide resin composition obtained in Example A20. Evaluation results of it are shown in Table 10.

Comparative Example A16

Mixture (A2) obtained in Production Example A21 was added to 100 parts by weight of Polyamide 66 (A3) obtained in Production Example A3, followed by dry blending. Blending was performed so as to adjust the amount of each compound to be the same as that of the polyamide resin composition obtained in Example A20. Evaluation results of the polyamide resin composition thus obtained are shown in Table 10.

Comparative Example A17

Melt polymerization was performed using an aqueous solution (having a concentration of 50 wt. %) of an equimolar salt of hexamethylenediamine and adipic acid in a known manner. During the polymerization, an aqueous mixed solution of CuI and KI was added. Ethylenebisstearylamide was added to the surface of the polyamide 66 pellets thus obtained. Each compound was added so that the amount of each compound was the same as that of the polyamide resin composition of Example A20. The polyamide 66 resin composition thus obtained had a relative viscosity of 2.8, a water content of 0.10 wt. %, and a concentration ratio of carboxyl groups of 0.625. Evaluation results of it are shown in Table 10.

TABLE 9

| | | | | Polyamide resin composition | | | |
| --- | --- | --- | --- | --- | --- | --- | --- |
| | | Unit | Example A20 | Example A21 | Example A22 | Example A23 |
| Raw material | Second polyamide Masterbatch | | Polyamide 66 (A2) Masterbatch of Example A1 | Polyamide 66 (A2) Masterbatch of Example A16 | Polyamide 66 (A1) Masterbatch of Example A1 | Polyamide 66 (A2) Masterbatch of Example A11 |
| Properties of | Water content | Weight % | 0.10 | 0.10 | 0.10 | 0.10 |

TABLE 9-continued

Polyamide resin composition

| | | Unit | Example A20 | Example A21 | Example A22 | Example A23 |
|---|---|---|---|---|---|---|
| polyamide resin composition | Tensile elongation | % | 25 | 20 | 20 | 25 |
| | Copper deposition property during retention in a molding machine | % | 1.0 | 2.5 | 2.0 | 2.0 |
| | Long-term heat aging resistance | Hr | 700 | 600 | 650 | 650 |
| | Color tone | b value | 1.0 | 1.0 | 0.5 | 1.0 |

TABLE 10

Polyamide resin composition

| | | Unit | Comp. Ex. A11 | Comp. Ex. A12 | Comp. Ex. A13 | Comp. Ex. A14 | Comp. Ex. A15 | Comp. Ex. A16 | Comp. Ex. A17 |
|---|---|---|---|---|---|---|---|---|---|
| Raw material | Second polyamide Masterbatch or mixture | | Polyamide 66 (A2) Masterbatch of Comp. Ex. A1 | Polyamide 66 (A2) Masterbatch of Comp. Ex. A2 | Polyamide 66 (A2) Masterbatch of Comp. Ex. A4 | Polyamide 66 (A2) Masterbatch of Comp. Ex. A6 | Polyamide 66 (A2) Masterbatch of Comp. Ex. A9 | Polyamide 66 (A3) Mixture (2) of Production Example A21 | — |
| Properties of polyamide resin composition | Water content | Weight % | 0.10 | 0.10 | 0.10 | 0.10 | 0.10 | 0.10 | 0.10 |
| | Tensile elongation | % | 15 | 15 | 17 | 12 | 20 | 10 | 25 |
| | Copper deposition property during retention in a molding machine | % | 7.0 | 7.0 | 5.0 | 6.0 | 7.0 | 10.0 | 5.0 |
| | Long-term heat aging resistance | hr | 500 | 500 | 575 | 500 | 550 | 500 | 550 |
| | Color tone | b value | 3.0 | 2.5 | 2.0 | 2.5 | 2.5 | 3.0 | 2.5 |

From Tables 9 and 10, it has been confirmed that the molded or formed product of the polyamide resin composition obtained using the masterbatch produced by the production method of the present invention is improved in copper deposition property, long-term heat aging resistance, and color tone.

INDUSTRIAL APPLICABILITY

The masterbatch produced by the production method of the present invention is suited for use in the fields of polyamide resins in which heat-resistance is required.

The invention claimed is:

1. A method for producing a masterbatch, which comprises mixing by melt kneading,
   a) 100 parts by weight of a polyamide having a water content of from 0.05 to 2.0 wt. %,
   b) from 0.1 to 10 parts by weight of an organic compound having at least one amide group,
   c) from 0.1 to 5 parts by weight of a copper compound having a maximum particle size of 50 μm or less, and
   d) from 1 to 50 parts by weight of a halogen compound (with the proviso that a copper halide is excluded) having a maximum particle size of 50 μm or less.

2. The method for producing a masterbatch according to claim 1, wherein the raw materials are mixed so that a molar ratio (halogen/copper) of a halogen and copper of the masterbatch to be produced is from 3 to 30.

3. The method for producing a masterbatch according to claim 1, wherein the copper compound and/or the halogen compound (with the proviso that a copper halide is excluded) has a maximum particle size of 20 μm or less.

4. The method for producing a masterbatch according to claim 1, wherein a concentration ratio of carboxyl groups in the polyamide ([COOH]/[COOH]+[NH$_2$])) is from 0.55 to 0.80.

5. The method for producing a masterbatch according to claim 1, wherein the polyamide has a water content of from 0.1 to 1.5 wt. %.

6. The method for producing a masterbatch according to claim 1, wherein the organic compound having at least one amide group is at least one compound selected from the group consisting of monoamides, substituted amides, methylolamides, and bisamides.

7. The method for producing a masterbatch according to claim 1, comprising mixing and grinding the copper compound and/or the halogen compound (with the proviso that a copper halide is excluded) and the organic compound having at least one amide group in advance.

8. A masterbatch produced by the production method as claimed in claim 1.

9. The masterbatch according to claim 8, which has a water content of from 0.06 to 1 wt. %.

10. A polyamide resin composition obtained by mixing 100 parts by weight of a second polyamide with from 0.1 to 100 parts by weight of the masterbatch as claimed in claim 8.

11. The polyamide resin composition according to claim 10, which has a water content of from 0.01 to 1 wt. %.

12. The method for producing a masterbatch according to claim 2, wherein the copper compound and/or the halogen compound (with the proviso that a copper halide is excluded) has a maximum particle size of 20 μm or less.

13. A polyamide resin composition obtained by mixing 100 parts by weight of a second polyamide with from 0.1 to 100 parts by weight of the masterbatch as claimed in claim 9.

* * * * *